(12) United States Patent
Ling et al.

(10) Patent No.: US 11,047,601 B2
(45) Date of Patent: Jun. 29, 2021

(54) METHOD AND SYSTEM OF HIGH-TEMPERATURE CALCIUM LOOPING THERMOCHEMICAL ENERGY STORAGE

(71) Applicant: NANJING TECH UNIVERSITY, Nanjing (CN)

(72) Inventors: Xiang Ling, Nanjing (CN); Xiaoyi Chen, Nanjing (CN); Yan Wang, Nanjing (CN); Xiaogang Jin, Nanjing (CN)

(73) Assignee: NANJING TECH UNIVERSITY, Nanjing (CN)

( * ) Notice: Subject to any disclaimer, the term of this patent is extended or adjusted under 35 U.S.C. 154(b) by 226 days.

(21) Appl. No.: 16/467,981

(22) PCT Filed: Mar. 6, 2017

(86) PCT No.: PCT/CN2017/075707
§ 371 (c)(1),
(2) Date: Jun. 9, 2019

(87) PCT Pub. No.: WO2018/103210
PCT Pub. Date: Jun. 14, 2018

(65) Prior Publication Data
US 2019/0331364 A1    Oct. 31, 2019

(30) Foreign Application Priority Data

Dec. 9, 2016    (CN) .......................... 201611126687.9

(51) Int. Cl.
*F24S 60/20*    (2018.01)
*F24S 23/70*    (2018.01)
(Continued)

(52) U.S. Cl.
CPC ............... *F24S 60/20* (2018.05); *F24S 23/70* (2018.05); *F24S 30/452* (2018.05); *F28D 20/003* (2013.01)

(58) Field of Classification Search
CPC .......... F24S 60/20; F24S 23/70; F24S 30/452; F28D 20/003; Y02E 70/30
See application file for complete search history.

(56) References Cited

U.S. PATENT DOCUMENTS 4,628,834 A * 12/1986 McKelvie ................. F23B 1/16
110/263
10,422,252 B2 * 9/2019 Allam ....................... F02C 1/08
(Continued)

FOREIGN PATENT DOCUMENTS

CN    102679563 A    9/2012
CN    102801367 A    11/2012
(Continued)

OTHER PUBLICATIONS

Chacartegui, R et al. "Thermochemical Energy Storage of Concentrated Solar Power by Integration of the Calcium Looping Process and a CO2 Power Cycle." Applied energy 173 (2016): 589-605. Web. (Year: 2016).*

*Primary Examiner* — Jorge A Pereiro
(74) *Attorney, Agent, or Firm* — Bayramoglu Law Offices LLC

(57) ABSTRACT

A method and a system of a high-temperature calcium looping thermochemical energy storage are provided. A thermochemical energy storage system is based on $CaCO_3$/$CaO$, and an energy storage is performed by a mutual transformation between a thermal energy and a chemical energy. When solar irradiation is sufficient, $CaCO_3$ solid particulates are indirectly heated by hot air generated from solar energy to perform an endothermic decomposition reaction, and received heat is stored in decomposition prod-
(Continued)

ucts of CaO and $CO_2$ in a form of the chemical energy. When heat is required, a reversible thermochemical reaction occurs between the CaO and $CO_2$ under an atmospheric pressure, and the chemical energy stored in the CaO and $CO_2$ is transformed into the heat for release.

8 Claims, 3 Drawing Sheets

(51) Int. Cl.
  *F24S 30/452* (2018.01)
  *F28D 20/00* (2006.01)

(56) References Cited

U.S. PATENT DOCUMENTS

| | | | |
|---|---|---|---|
| 2005/0060985 A1* | 3/2005 | Abanades Garcia | B01D 53/62 60/274 |
| 2012/0216536 A1* | 8/2012 | Ma | F03G 6/00 60/641.8 |
| 2017/0058712 A1* | 3/2017 | Allam | F02C 3/34 |
| 2019/0376419 A1* | 12/2019 | Allam | F25J 3/04018 |

FOREIGN PATENT DOCUMENTS

| | | | |
|---|---|---|---|
| CN | 104456512 A | 3/2015 | |
| CN | 104806311 A | 7/2015 | |
| CN | 105423791 A | 3/2016 | |
| WO | WO-2015048845 A1 * | 4/2015 | F03G 6/064 |

* cited by examiner

METHOD AND SYSTEM OF HIGH-TEMPERATURE CALCIUM LOOPING THERMOCHEMICAL ENERGY STORAGE

CROSS REFERENCE TO RELATED APPLICATIONS

This application is the national phase entry of International Application No. PCT/CN2017/075707, filed on Mar. 6, 2017, which is based upon and claims priority to Chinese Patent Application No. 201611126687.9, filed on Dec. 9, 2016, the entire contents of which are incorporated herein by reference.

TECHNICAL FIELD

The present invention pertains to the field of solar energy power generation, and particularly relates to a high-temperature calcium looping thermochemical energy storage method and system.

BACKGROUND

Solar energy power generation has the advantages of having rich sources, and no environmental pollution, etc., thereby becoming an ideal alternative energy source. Nonetheless, due to the features of intermittency, low density, instability and unsustainable supply of solar energy, many problems still need to be solved when performing solar thermal power generation. Specifically, how to realize an efficient and large-scale storage of solar energy and ensure a sustainable supply of solar thermal power generation is a key technology of solar thermal power generation. Among the main heat storage methods such as a sensible heat energy storage, a latent heat energy storage and a thermochemical energy storage, etc., the thermochemical energy storage has significant advantages such as having a high energy storage density, a high reaction temperature, a low loss in a long-term heat storage, etc., and can effectively solve the problems of conversion, storage and regeneration of the electric energy. At present, research is mainly conducted on chemical reaction energy storage systems including a $CaCO_3/CaO$ system, a $NH_3$ synthesis and decomposition system, a $CH_4/CO_2$ and $CH_4/H_2O$ reforming system, a $Ca(OH)_2/CaO$ system, a $Co_3O_4/CoO$ system, a $MgH_2/H_2$ system, etc., wherein the $CaCO_3/CaO$ system is a relatively ideal thermochemical energy storage system. The $CaCO_3/CaO$ system has significant advantages such as having a high energy storage density (692 kWh/m$^3$), no toxic effect, and good safety performance. Moreover, for the $CaCO_3/CaO$ system, raw materials have extensive sources and low prices, no side reaction occurs, and a temperature (700° C.-1000° C.) of a reaction under an atmospheric pressure is high. Consequently, the $CaCO_3/CaO$ system is used for the solar high-temperature thermochemical energy storage, which can well solve the problem of continuous and efficient power generation operation of the solar high-temperature thermal power station. In China, the research on the $CaCO_3/CaO$ system used for thermochemical energy storage is still at an initial stage, having no relevant patents.

SUMMARY

Objective of the Invention

The objective of the present invention is to provide a method and a system of a high-temperature calcium looping thermochemical energy storage, which can effectively solve the problems of conversion, storage and regeneration of the electric energy.

Technical Solutions

A high-temperature calcium looping thermochemical energy storage system includes a solar energy heat collecting device, an energy storage device and a power generation device.

The solar energy heat collecting device includes a heliostat, a solar energy absorption tower, a heat exchanger A and a cold air storage tank. The heliostat is provided on a side of the solar energy absorption tower, so that sunlight reflected by the heliostat can be absorbed by the solar energy absorption tower. The solar energy absorption tower, the heat exchanger A and the cold air storage tank are sequentially connected by using circulation pipelines.

The energy storage device includes a powder heat exchanger B, a reactor, a powder heat exchanger C, a high-temperature CaO storage tank, a high-temperature $CaCO_3$ storage tank, a mill, a compressor A, a $CO_2$ storage tank and a gate valve B. An outlet of the $CO_2$ storage tank is provided with two $CO_2$ circulation pipelines. A first $CO_2$ circulation pipeline of the two $CO_2$ circulation pipelines is configured for sequential connections of the outlet of the $CO_2$ storage tank, the heat exchanger A, the gate valve B, the reactor, the powder heat exchanger B, the compressor A, and an inlet of the $CO_2$ storage tank. A second $CO_2$ circulation pipeline of the two $CO_2$ circulation pipelines is configured for sequential connections of the outlet of the $CO_2$ storage tank, the powder heat exchanger C, the gate valve B, the reactor, the powder heat exchanger B, the compressor A, and the inlet of the $CO_2$ storage tank A. A solid particulate material inlet of the reactor is connected to the high-temperature $CaCO_3$ storage tank, and the powder heat exchanger B and the mill are sequentially provided between the connection pipelines. A solid particulate material outlet of the reactor is connected to the high-temperature CaO storage tank, and the powder heat exchanger C is provided between the connection pipelines.

The power generation device includes the powder heat exchanger B, the reactor, the powder heat exchanger C, the high-temperature CaO storage tank, the high-temperature $CaCO_3$ storage tank, and the $CO_2$ storage tank, a turbine, a condenser, a compressor B, an expander, a gate valve A, the gate valve B. A gas outlet of the reactor, the turbine, the powder heat exchanger B, the condenser, the compressor B, the gate valve A, a heating device, the gate valve B, a gas inlet of the reactor are sequentially connected by using the circulation pipelines. The $CO_2$ storage tank and a gas inlet of the expander are connected to each other, and the powder heat exchanger C is provided between the connection pipelines. A gas outlet of the expander and the reactor are connected to each other, and the heating device is provided between the connection pipelines. The solid particulate material inlet of the reactor is connected to the high-temperature CaO storage tank, and the powder heat exchanger B is sequentially provided between the connection pipelines. The solid particulate material outlet of the reactor is connected to the high-temperature $CaCO_3$ storage tank, and the powder heat exchanger C is provided between the connection pipelines.

Further, the heating device includes a heater, a gate valve C, a gate valve D. The heater is sequentially connected to the gate valve C. The gate valve D is respectively connected to the heater and the gate valve C in parallel.

For the reduction of abrasion and blockage, the reactor is preferably a bidirectional high-temperature vibrating fluidized bed reactor. A high-temperature resistant conveyor is provided inside the reactor, which has a function of promoting sufficient fluidization of solid particulates, and makes the solid particulates fully react with the gas.

In consideration of the requirements for the safety, reliability, maintainability, and manufacturability of the system due to the particularity of high-temperature energy storage, the bidirectional high-temperature vibrating fluidized bed reactor is made of Inconel 617 material.

A high-temperature calcium looping thermochemical energy storage method, wherein a thermochemical energy storage system is $CaCO_3/CaO$, and an energy storage is performed by a mutual transformation between a thermal energy and a chemical energy. When solar irradiation is sufficient, $CaCO_3$ solid particulates are indirectly heated by hot air generated from solar energy to perform an endothermic decomposition reaction, and received heat is stored in decomposition products of CaO and $CO_2$ in a form of chemical energy. When heat is required, a reversible thermochemical reaction between the CaO and the $CO_2$ occurs under atmospheric pressure, and the chemical energy stored in the CaO and the $CO_2$ is reversely converted into the heat for release.

A high-temperature calcium looping thermochemical reaction process includes an energy storage stage and an energy release stage. In the energy storage stage, original $CO_2$ and high-temperature hot air absorbing solar energy exchange heat in the heat exchanger A, so that $CaCO_3$ solid particulates reach a reaction temperature and a fluidization state in a bidirectional high-temperature vibrating fluidized bed reactor. The $CaCO_3$ solid particulates are subjected to a decomposition reaction at a reaction temperature of 900-1100° C. As further proceeding an energy storage reaction process, reaction waste heat of the product $CO_2$ generated by decomposing the $CaCO_3$ solid particulates is configured to preheat subsequently reacted $CaCO_3$ solid particulates in the powder heat exchanger B; reaction waste heat of the product CaO generated by decomposing the $CaCO_3$ solid particulates in the powder heat exchanger C is configured to preheat the $CO_2$ in the $CO_2$ storage tank. In the energy release stage, the $CO_2$ reacts with CaO solid particulates to form $CaCO_3$ solid particulates at a reaction temperature of 500-700° C., releasing a large amount of heat. At this time, the $CO_2$ is in a supercritical state, and cooperates with Rankine Cycle and Brayton Cycle to realize the power generation. In the whole high-temperature calcium looping thermochemical energy storage system, the $CaCO_3$ solid particulates and CaO solid particulates are transported by spiral feeding to prevent the leakage of the $CO_2$ gas.

Beneficial Effects

The present invention realizes the regeneration of high-temperature thermal energy by using a thermochemical reversible reaction $CaCO_3/CaO$ system. $CO_2$ is used as a heat exchange medium, a fluidization medium, and a reaction medium in the process. In the energy release process, the temperature of $CO_2$ is greater than 31° C., and the pressure of $CO_2$ is greater than 7 MPa. The $CO_2$ is in a supercritical state, and can achieve the sustainable power supply of electric energy without sunlight, and smoothen the power curve of the solar energy thermal power station after going through the Rankine Cycle and Brayton Cycle in the system. Meanwhile, the heat and pressure energy of the $CO_2$ generated by the decomposition of $CaCO_3$ are effectively utilized, and the high-temperature heat energy in the system is recovered and utilized by the heat reservoir and the heat exchanger, thereby realizing the integrated step-like utilization of energy, and greatly promoting the efficiency of the energy storage system.

In the novel high-temperature calcium looping thermochemical energy storage system provided by the present invention, the reversible reaction $CaCO_3(s) \leftrightarrows CaO(s)+CO_2(g)$ is driven by the solar energy heat collection, and the received energy is stored in the form of chemical energy in the decomposition product of CaO and $CO_2$. The present invention has the characteristics such as high energy storage density, high circulation efficiency, environmental friendliness, simple structure, flexible control of variable working conditions and reliability. The present invention can solve the problem of continuous and efficient power generation operation of the solar high-temperature thermal power station, and can be widely applied in solar high-temperature power generation field as well as the high-temperature thermal energy storage and regeneration of other types of power stations.

In the present invention, the energy storage/release is adjusted and controlled by changing temperature, that is, the decomposition/synthesis reaction of $CaCO_3$ solid particulates. The problem of low energy utilization rate caused by the unmatched and uneven heat usage due to time or location is solved according to the concept of energy transformation from thermal energy to chemical energy and to thermal energy.

DETAILED DESCRIPTION OF THE EMBODIMENTS

In order to deeply understand the present invention, the present invention will be further described with reference to the embodiment and the drawings. The embodiment is merely used for illustrating the present invention and forms no limitation to the protection scope of the present invention.

Embodiment 1

Figure 1:
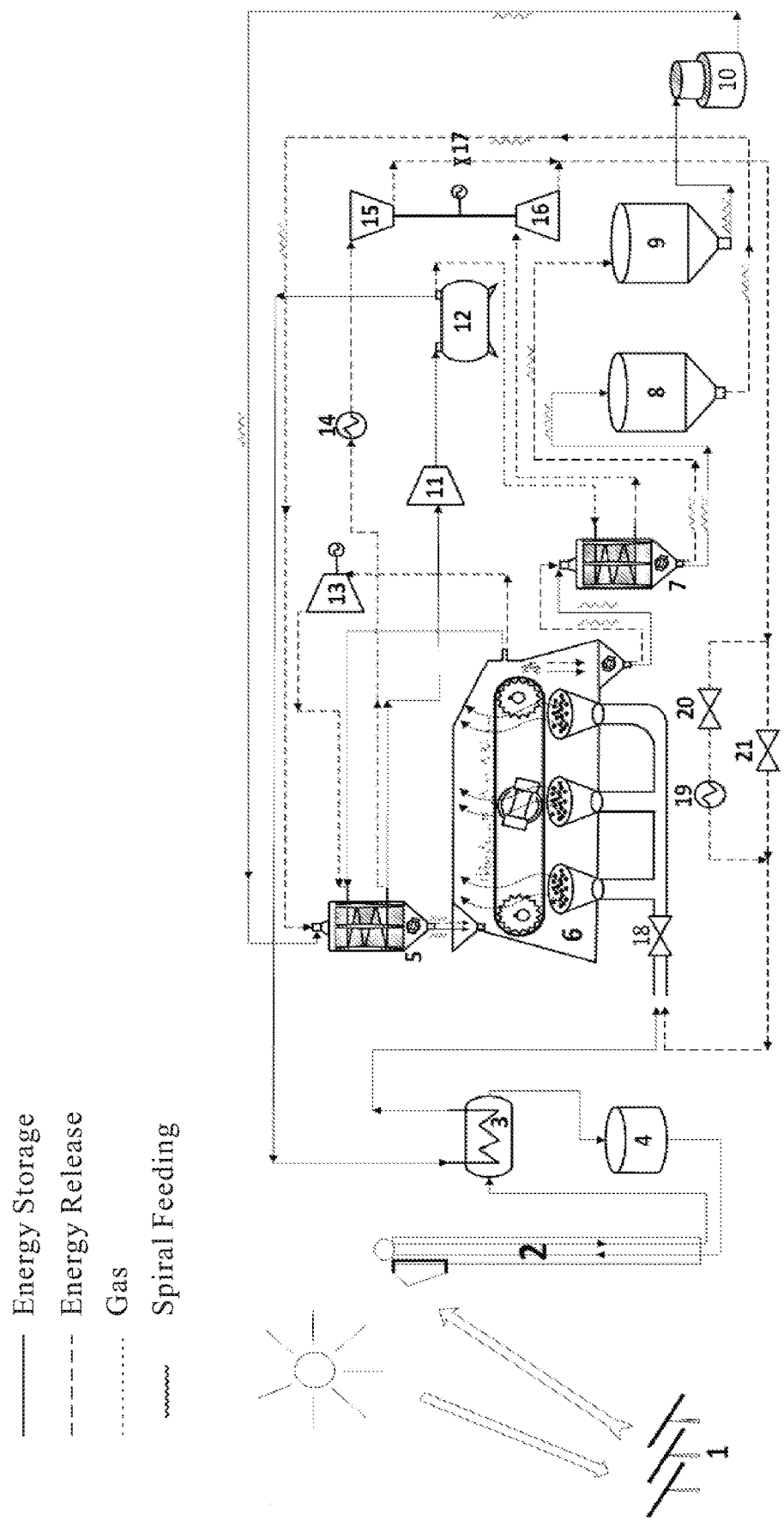
FIG. 1 is a schematic diagram of an overall workflow of a system of the present invention.

As shown in FIG. 1, a high-temperature calcium looping thermochemical energy storage system includes the solar energy heat collecting device, the energy storage device and power generation device.

The solar energy heat collecting device includes the heliostat (1), the solar energy absorption tower (2), the heat exchanger A (3) and the cold air storage tank (4). The heliostat (1) is provided on a side of the solar energy absorption tower (2), so that sunlight reflected by the heliostat (1) can be absorbed by the solar energy absorption tower (2). The solar energy absorption tower (2), the heat exchanger A (3) and the cold air storage tank (4) are sequentially connected by using circulation pipelines.

The energy storage device includes the powder heat exchanger B (5), the high-temperature vibrating fluidized bed reactor (6), the powder heat exchanger C (7), the high-temperature CaO storage tank (8), the high-temperature $CaCO_3$ storage tank (9), the mill (10), the compressor A (11), the $CO_2$ storage tank (12) and the gate valve B (18). An outlet of the $CO_2$ storage tank (12) is provided with two $CO_2$ circulation pipelines. A first $CO_2$ circulation pipeline of the two $CO_2$ circulation pipelines is configured for sequential connections of the outlet of the $CO_2$ storage tank (12), the heat exchanger A (3), the gate valve B (18), the high-temperature vibrating fluidized bed reactor (6), the powder heat exchanger B (5), the compressor A (11), an inlet of the $CO_2$ storage tank (12). A second $CO_2$ circulation pipeline of the two $CO_2$ circulation pipelines is configured for sequential connections of the outlet of the $CO_2$ storage tank (12), the powder heat exchanger C (7), the gate valve B (18), the high-temperature vibrating fluidized bed reactor (6), the powder heat exchanger B (5), the compressor A (11), and the inlet of the $CO_2$ storage tank (12). A solid particulate material inlet of the high-temperature vibrating fluidized bed reactor (6) is connected to the high-temperature $CaCO_3$ storage tanks (9), and the powder heat exchanger B (5) and the mill (10) are sequentially provided between the connection pipelines. A solid particulate material outlet of the high-temperature vibrating fluidized bed reactor (6) is connected to the high-temperature CaO storage tank (8), and the powder heat exchanger C (7) is provided between the connection pipelines.

The power generation device includes the powder heat exchanger B (5), the high-temperature vibrating fluidized bed reactor (6), the powder heat exchanger C (7), the high-temperature CaO storage tank (8), the high-temperature $CaCO_3$ storage tank (9), and the $CO_2$ storage tank (12), the turbine (13), the condenser (14), the compressor B (15), the expander (16), the gate valve A (17), the gate valve B (18). A gas outlet of the high-temperature vibrating fluidized bed reactor (6), the turbine (13), the powder heat exchanger B (5), the condenser (14), the compressor B (15), the gate valve A (17), a heating device, the gate valve B (18), a gas inlet of the bidirectional high-temperature vibrating fluidized bed reactor (6) are sequentially connected by using the circulation pipelines. The $CO_2$ storage tank (12) and a gas inlet of the expander (16) are connected to each other, and the powder heat exchanger C (7) is provided between the connection pipelines. A gas outlet of the expander (16) and the high-temperature vibrating fluidized bed reactor (6) are connected to each other and the heating device is provided between the connection pipelines. The solid particulate material inlet of the high-temperature vibrating fluidized bed reactor (6) is connected to the high-temperature CaO storage tank (8) and the powder heat exchanger B (5) is provided between the connection pipelines. The solid particulate material outlet of the high-temperature vibrating fluidized bed reactor (6) is connected to the high-temperature $CaCO_3$ storage tank (9) and the powder heat exchanger C (7) is provided between the connection pipelines.

The heating device includes the heater (19), the gate valve C (20), and the gate valve D (21). The heater (19) is sequentially connected to the gate valve C (20). The gate valve D (21) is respectively connected to the heater (19) and the gate valve C (20) in parallel.

The bidirectional high-temperature vibrating fluidized bed reactor is made of Inconel 617 material.

The workflow of the high-temperature calcium looping thermochemical energy storage system includes is as follows.

Figure 2:
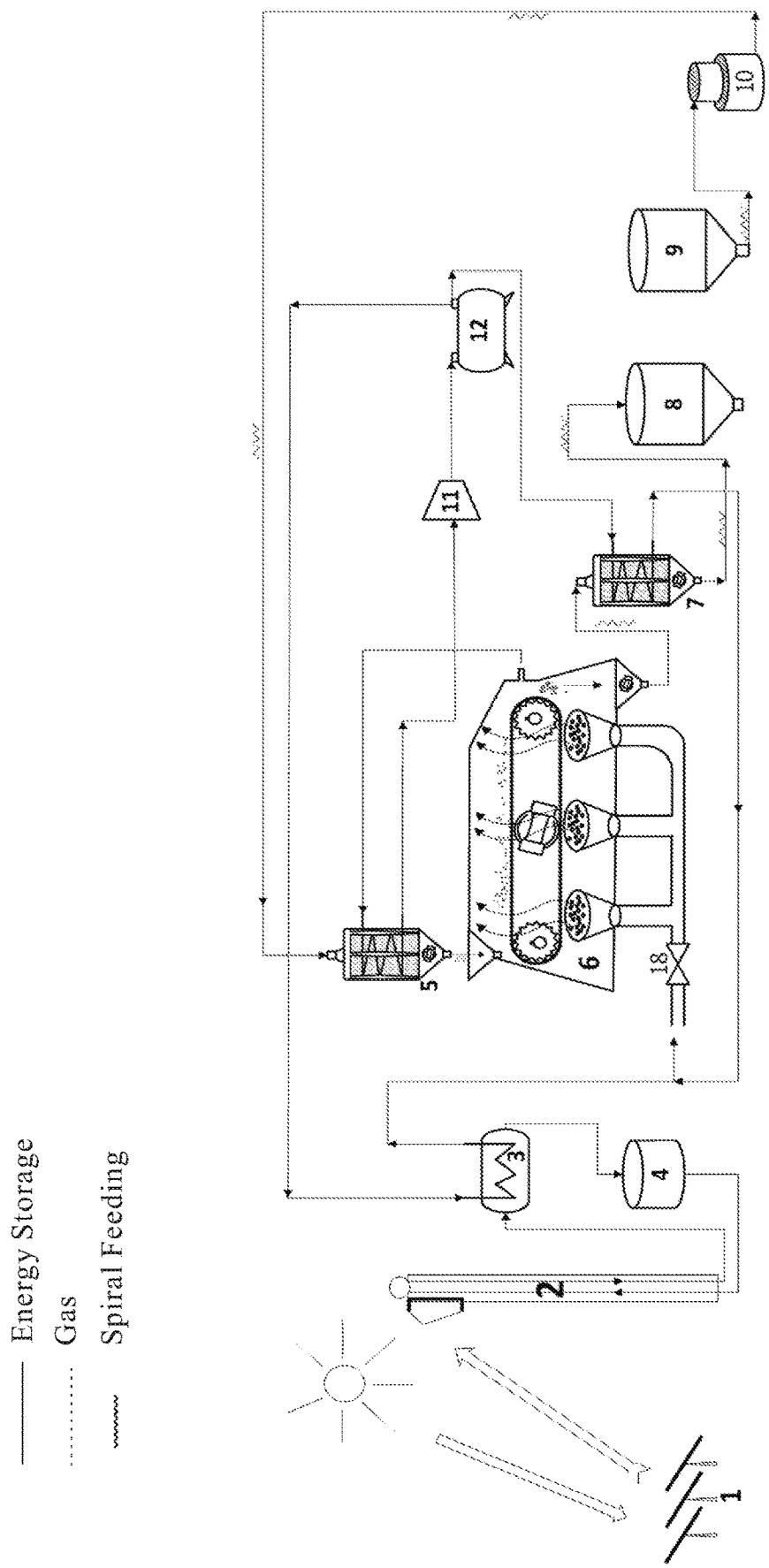
FIG. 2 is a schematic diagram showing an energy storage in a workflow of a system of the present invention.

In the energy storage stage, when the solar irradiation is sufficient, as shown in FIG. 2, the sunlight passes through the heliostat (1), and the solar irradiation heat is connected via the air in the solar energy absorption tower (2). The original $CO_2$ sufficiently exchanges the heat with the high-temperature hot air in the heat exchanger A (3). Then, the high-temperature $CO_2$ enters the bidirectional high-temperature vibrating fluidized bed reactor (6) to fluidize the $CaCO_3$ solid particulates to perform a decomposition reaction. As further proceeding the decomposition reaction, the decomposition product $CO_2$ is configured to preheat the subsequent $CaCO_3$ solid particulates in the powder heat exchanger B (5), and then compression and storage are performed by the compressor A (11). In order to make full use of the waste heat in the reaction, $CO_2$ sufficiently exchanges the heat with the decomposition product CaO in the powder heat exchanger C (7), and then enters the bidirectional high-temperature vibrating fluidized bed reactor (6) to repeat the previous process, so as to fully utilize the heat. After passing through the heat exchanger A (3), the high-temperature hot air is stored in the cold air storage tank (4).

Figure 3:
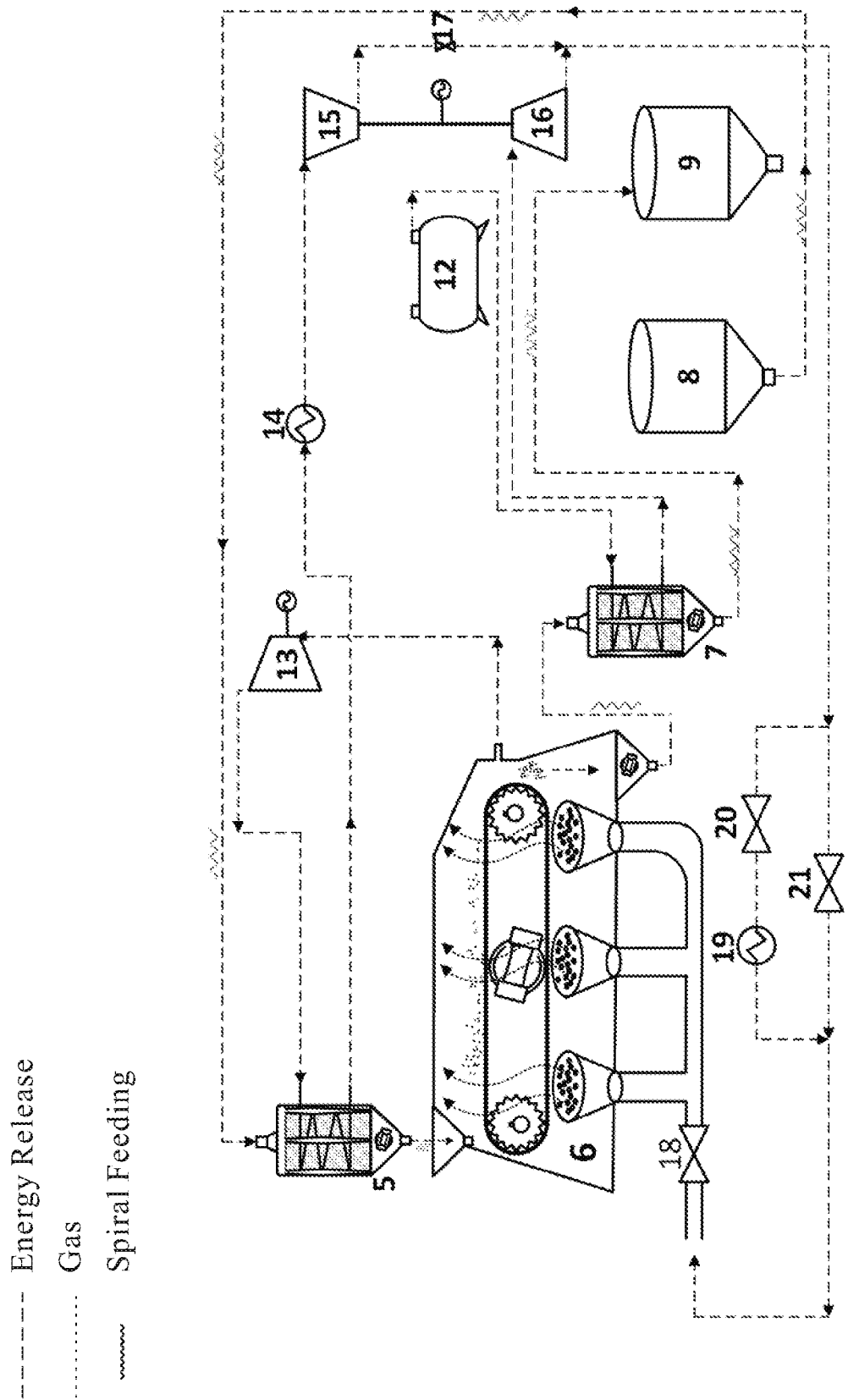
FIG. 3 is a schematic diagram showing an energy release in a workflow of a system of the present invention.

In the energy release stage, when the solar irradiation is insufficient, as shown in FIG. 3, when the energy is released for the first time to generate the power, the gate valve C (20) is opened and the gate valve D (21) is closed. $CO_2$ is heated to reach the reaction temperature through the expander (16) and the heater (19), then enters the bidirectional high-temperature vibrating fluidized bed reactor (6) to fluidize CaO, and a synthesis reaction occurs between the $CO_2$ and the fluidized CaO, releasing a large amount of heat. At this time, the temperature of $CO_2$ is greater than 31° C., and the pressure of $CO_2$ is greater than 7 MPa. The $CO_2$ is in a supercritical state and generate the power by the turbine (13). After $CO_2$ passes through the turbine (13) to generate the power, the remaining heat can preheat the CaO solid particulates. After the initial energy release, the gate valve C (20) is closed, and the gate valve D (21) is opened. $CO_2$ is preheated in the powder heat exchanger C (7) by using the waste heat of the synthetic product $CaCO_3$ solid particulates to reach the reaction temperature, and the previous $CO_2$ process is repeated. In the energy release process, after subjected to a heating through the powder heat exchanger C (7), and an expansion through the expander (16), the $CO_2$ preheats the CaO solid particulates, and then enters the condenser (14) to be cooled. After entering the compressor B (15), $CO_2$ is compressed to achieve power generation by the work of bearing.

In the whole high-temperature calcium looping thermochemical energy storage system, the $CaCO_3$ solid particulates and CaO solid particulates are transported by spiral feeding to prevent the leakage of the $CO_2$ gas.

The above description is merely a preferred embodiment of the present invention, which is not intended to limit the present invention. Any modifications, equivalent substitutions, improvements, etc. that are made within the spirit and principle of the present invention should be contained in the protection scope of the present invention.

What is claimed is:

1. A high-temperature calcium looping thermochemical energy storage system, comprising: a solar energy heat collecting device, an energy storage device, and a power generation device;
wherein
the solar energy heat collecting device comprises a heliostat, a solar energy absorption tower, a first heat exchanger, and a cold air storage tank; the heliostat is provided on a side of the solar energy absorption tower; the solar energy absorption tower is configured to absorb sunlight reflected by the heliostat; the solar energy absorption tower, the first heat exchanger and the cold air storage tank are sequentially connected by using first circulation pipelines;

the energy storage device comprises a first powder heat exchanger, a reactor, a second powder heat exchanger, a high-temperature CaO storage tank, a high-temperature $CaCO_3$ storage tank, a mill, a first compressor, a $CO_2$ storage tank, and a first gate valve; an outlet of the $CO_2$ storage tank is provided with two $CO_2$ circulation pipelines, a first $CO_2$ circulation pipeline of the two $CO_2$ circulation pipelines is configured for sequential connections of an outlet of the $CO_2$ storage tank, the first heat exchanger, the first gate valve, the reactor, the first powder heat exchanger, the first compressor, an inlet of the $CO_2$ storage tank, and a second $CO_2$ circulation pipeline of the two $CO_2$ circulation pipelines is configured for sequential connections of the outlet of the $CO_2$ storage tank, the second powder heat exchanger, the first gate valve, the reactor, the first powder heat exchanger, the first compressor, and the inlet of the $CO_2$ storage tank; a solid particulate material inlet of the reactor is connected to the high-temperature $CaCO_3$ storage tank, and the first powder heat exchanger and the mill are sequentially provided between first connection pipelines; a solid particulate material outlet of the reactor is connected to the high-temperature CaO storage tank, and the second powder heat exchanger is provided between second connection pipelines; and the power generation device comprises the first powder heat exchanger, the reactor, the second powder heat exchange, the high-temperature CaO storage tank, the high-temperature $CaCO_3$ storage tank, and the $CO_2$ storage tank, a turbine, a condenser, a second compressor, an expander, a second gate valve, the first gate valve; a gas outlet of the reactor, the turbine, the second powder heat exchanger, the condenser, the second compressor, the first gate valve, a heating device, the first gate valve, a gas inlet of the reactor are sequentially connected by using second circulation pipelines; the $CO_2$ storage tank and a gas inlet of the expander are connected to each other, and the second powder heat exchanger is provided between third connection pipelines; a gas outlet of the expander and the reactor are connected to each other, and the heating device is provided between fourth connection pipelines; the solid particulate material inlet of the reactor is connected to the high-temperature CaO storage tank, and the first powder heat exchanger is provided between fifth connection pipelines; and the solid particulate material outlet of the reactor is connected to the high-temperature $CaCO_3$ storage tank, and the second powder heat exchanger is provided between sixth connection pipelines.

2. The high-temperature calcium looping thermochemical energy storage system according to claim 1, wherein the heating device comprises a heater, a third gate valve, and a fourth gate valve; the heater is connected to the third gate valve; and the fourth gate valve is respectively connected to the heater and the third gate valve in parallel.

3. The high-temperature calcium looping thermochemical energy storage system according to claim 2, wherein the reactor is a bidirectional high-temperature vibrating fluidized bed reactor; and a high-temperature resistant conveyor is provided inside the reactor.

4. The high-temperature calcium looping thermochemical energy storage system according to claim 3, wherein the bidirectional high-temperature vibrating fluidized bed reactor is made of Inconel 617 material.

5. The high-temperature calcium looping thermochemical energy storage system according to claim 1, wherein the reactor is a bidirectional high-temperature vibrating fluidized bed reactor; and a high-temperature resistant conveyor is provided inside the reactor.

6. The high-temperature calcium looping thermochemical energy storage system according to claim 5, wherein the bidirectional high-temperature vibrating fluidized bed reactor is made of Inconel 617 material.

7. A high-temperature calcium looping thermochemical energy storage method, wherein a thermochemical energy storage system is based on $CaCO_3$/CaO, and an energy storage is performed by a mutual transformation between a thermal energy and a chemical energy;

wherein the method comprises:
when solar irradiation is sufficient, performing an endothermic decomposition reaction on $CaCO_3$ solid particulates after the $CaCO_3$ solid particulates are indirectly heated by hot air generated from solar energy,
storing received heat in decomposition products of CaO and $CO_2$ in a form of the chemical energy;
wherein when heat is required, a reversible thermochemical reaction occurs between the CaO and the $CO_2$ under an atmospheric pressure, and the chemical energy stored in the CaO and the $CO_2$ is transformed into the heat for release, the method further comprising
an energy storage stage and an energy release stage; wherein
in the energy storage stage, original $CO_2$ exchanges heat with high-temperature hot air absorbing the solar energy in a first heat exchanger and $CaCO_3$ solid particulates reach a reaction temperature and a fluidization state in a bidirectional high-temperature vibrating fluidized bed reactor; the $CaCO_3$ solid particulates are subjected to a decomposition reaction at a reaction temperature of 900-1100° C.; proceeding an energy storage reaction process, reaction waste heat of product $CO_2$ generated by decomposing the $CaCO_3$ solid particulates is configured to preheat subsequently reacted $CaCO_3$ solid particulates in a first powder heat exchanger; reaction waste heat of product CaO generated by decomposing the $CaCO_3$ solid particulates in a second powder heat exchanger is configured to preheat $CO_2$ in a $CO_2$ storage tank; and
in the energy release stage, the $CO_2$ reacts with CaO solid particulates to form $CaCO_3$ solid particulates at a reaction temperature of 500-700° C., and release a large amount of heat; at this time, the $CO_2$ is in a supercritical state, and cooperates with a Rankine Cycle and a Brayton Cycle to realize a power generation.

8. The high-temperature calcium looping thermochemical energy storage method according to claim 7, wherein the $CaCO_3$ solid particulates and the CaO solid particulates are transported by a spiral feeding to prevent a leakage of the $CO_2$ gas.

* * * * *